H. A. SPARBER.
COFFEE FILTER.
APPLICATION FILED APR. 4, 1914.

1,171,675.  Patented Feb. 15, 1916.

Witnesses
Frederick W. Ely
J. W. Gartner

Inventor
Harry A. Sparber
By Victor J. Evans
Attorney

UNITED STATES PATENT OFFICE.

HARRY A. SPARBER, OF LETHBRIDGE, ALBERTA, CANADA.

COFFEE-FILTER.

1,171,675.  Specification of Letters Patent.  Patented Feb. 15, 1916.

Application filed April 4, 1914. Serial No. 829,604.

*To all whom it may concern:*

Be it known that I, HARRY A. SPARBER, a citizen of Canada, residing at Lethbridge, in the Province of Alberta and Dominion of Canada, have invented new and useful Improvements in Coffee-Filters, of which the following is a specification.

The invention relates to a filter for use with coffee pots and similar utensils, wherein the solid material is conveniently held and subjected to the action of the water, while prevented from mixing with the resultant solution, whereby the coffee when poured from the pot will be clear from solid particles.

The main object of the present invention is the provision of a filter device which is readily applied to or removed from the coffee pot as an entirety with the parts constructed for ready separation to introduce the ground material therein.

The invention in the preferred form of details will be described in the following specification, reference being had particularly to the accompanying drawings, in which:—

Figure 1:
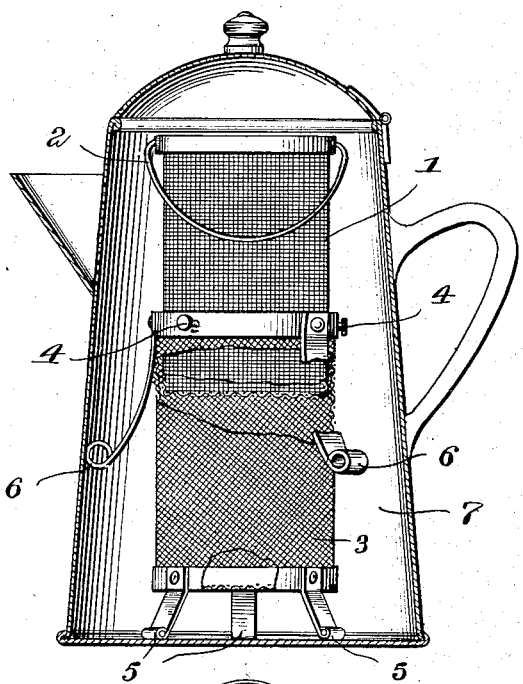
Figure 2:
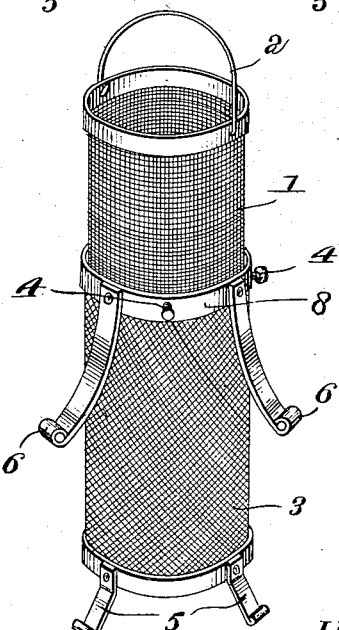

Figure 1 is a vertical sectional view illustrating the device in use in the coffee pot. Fig. 2 is a perspective view of the device detached.

In carrying out the improvement, I provide a material receiving cage 1 of any foraminous material having a bail 2 at the upper end whereby the device may be handled as a whole.

A filtering chamber 3 is provided which is here shown as in the form of an open vessel like structure, preferably cylindrical and including a side wall and bottom constructed wholly of screen cloth. The upper end of the filter 3 is open to receive the material container 1 the lower portion of the latter being inserted in the upper end of the filter. A band 8 passes around and is arranged at the upper end of the filter and is provided with clamping jaws which engage the container. Hence the container may be arranged at any desired height within the filtering vessel. The filtering vessel is provided at its lower end with supporting legs 5 to bear on the bottom of the pot in which the device is used. Centering arms have their upper ends attached to the band 8.

In the use of the improvement, the material is placed in the container 1 and the latter inserted to the proper depth within the filtering vessel and secured in such position by the screws 4. The device as a whole, through manipulation of the same by means of the bail 2 is then placed in the coffee pot 7, the device being supported by the legs 5 and centrally spaced within the coffee pot through the medium of the arms 6. The water poured into the pot is heated in the usual manner until the solution is of the proper strength, the filtering medium separating the solid particles from the solution so that when poured from the pot it is absolutely clear of any sediment.

The structure is of course to be made in various sizes and may be particularly constructed with a view to its coöperation with the special type of coffee pot, its use being also contemplated with materials other than coffee if desired.

What is claimed is:—

The herein described filter for use in a coffee pot and comprising a filtering vessel of screen material having an open upper end and having supporting legs at its lower end, a foraminous material container adapted to slidably fit within the filter vessel, a band around the filtering vessel, clamping screws carried by the band and to secure the container in adjusted position within the filtering vessel and spacing arms also carried by the band and adapted to engage the wall of the pot.

In testimony whereof I affix my signature in presence of two witnesses.

HARRY A. SPARBER.

Witnesses:
L. S. MCALLISTER,
S. CRERT.